(12) United States Patent  (10) Patent No.: US 7,225,994 B2
Finkelstein                 (45) Date of Patent: *Jun. 5, 2007

(54) FINANCIAL TRANSACTION CARD WITH SOUND RECORDING

(75) Inventor: Alan Finkelstein, Beverly Hills, CA (US)

(73) Assignee: Innovative Card Technologies, Inc., Los Angeles, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 10/300,556

(22) Filed: Nov. 20, 2002

(65) Prior Publication Data

US 2004/0026506 A1   Feb. 12, 2004

Related U.S. Application Data

(63) Continuation-in-part of application No. 10/213,475, filed on Aug. 6, 2002, now abandoned.

(51) Int. Cl.
  *G05K 19/06*   (2006.01)

(52) U.S. Cl. .................. 235/493; 235/449; 235/380

(58) Field of Classification Search ............... 235/493, 235/380, 492, 375, 382, 435, 441, 449, 487; 379/357.01, 357.03, 91.01, 93.03; 705/73, 705/24

See application file for complete search history.

(56) References Cited

U.S. PATENT DOCUMENTS

| | | | |
|---|---|---|---|
| 3,752,904 A | * | 8/1973 | Waterbury .................. 725/25 |
| 4,614,144 A | | 9/1986 | Sagara et al. |
| 4,752,670 A | * | 6/1988 | Traub et al. ................. 219/238 |
| 4,752,676 A | * | 6/1988 | Leonard et al. ............. 235/379 |
| 4,791,741 A | | 12/1988 | Kondo |
| 4,916,296 A | | 4/1990 | Streck |
| 4,965,440 A | * | 10/1990 | Hasegawa .................... 235/487 |
| 4,995,077 A | * | 2/1991 | Malinowski ........... 379/357.03 |
| 5,056,145 A | | 10/1991 | Yamamoto et al. |
| 5,192,947 A | | 3/1993 | Neustein |
| 5,412,192 A | | 5/1995 | Hoss |
| 5,433,035 A | | 7/1995 | Bauer |
| 5,434,400 A | * | 7/1995 | Scherzer ...................... 235/449 |
| 5,475,756 A | * | 12/1995 | Merritt ........................ 705/73 |
| 5,502,463 A | | 3/1996 | Sasaki et al. |
| 5,539,819 A | * | 7/1996 | Sonoyama et al. .... 379/357.03 |
| 5,623,552 A | * | 4/1997 | Lane .......................... 382/124 |
| 5,641,164 A | | 6/1997 | Doederlein |
| 5,652,606 A | | 7/1997 | Sasaki et al. |
| 5,679,939 A | | 10/1997 | Watanabe |
| 5,834,756 A | | 11/1998 | Gutman et al. |
| 5,864,623 A | * | 1/1999 | Messina et al. ............ 340/5.86 |
| 5,894,275 A | | 4/1999 | Swingle |
| 5,903,869 A | | 5/1999 | Jacobson et al. |

(Continued)

*Primary Examiner*—Thien M. Le
*Assistant Examiner*—Edwyn Labaze
(74) *Attorney, Agent, or Firm*—Blakely, Sokoloff, Taylor & Zafman, LLP

(57) ABSTRACT

A distinctive recorded sound is generated when a credit card or other financial transaction card is used at a point of sale (POS) terminal. As is common, the POS terminal includes a card reader through which the card is swiped to read data that is encoded on a magnetic stripe affixed to the card. A recorded sound may be stored in the card or in the card reader. In either case, the sound is played back through the card reader when the card is swiped.

6 Claims, 3 Drawing Sheets

U.S. PATENT DOCUMENTS

| | | | |
|---|---|---|---|
| 5,955,961 A * | 9/1999 | Wallerstein | 340/5.4 |
| 6,000,620 A * | 12/1999 | May | 235/493 |
| 6,021,393 A * | 2/2000 | Honda et al. | 705/3 |
| 6,053,406 A * | 4/2000 | Litman | 235/449 |
| 6,129,277 A * | 10/2000 | Grant et al. | 235/449 |
| 6,282,819 B1 | 9/2001 | Gu | |
| 6,292,780 B1 | 9/2001 | Doederlein et al. | |
| 6,325,284 B1 * | 12/2001 | Walker et al. | 235/380 |
| 6,382,516 B1 * | 5/2002 | King | 235/492 |
| 6,478,221 B1 * | 11/2002 | Sommerville | 235/379 |
| 6,481,623 B1 * | 11/2002 | Grant et al. | 235/449 |
| 6,679,425 B1 * | 1/2004 | Sheppard et al. | 235/382 |
| 6,715,679 B1 * | 4/2004 | Infosino | 235/449 |
| 6,739,505 B2 * | 5/2004 | Walker et al. | 235/380 |
| 6,959,874 B2 * | 11/2005 | Bardwell | 235/493 |
| 2001/0053947 A1 * | 12/2001 | Lenz et al. | 700/117 |
| 2002/0148892 A1 * | 10/2002 | Bardwell | 235/380 |
| 2003/0133262 A1 * | 7/2003 | Minne' | 361/684 |
| 2005/0242193 A1 * | 11/2005 | Smith et al. | 235/487 |
| 2006/0032906 A1 * | 2/2006 | Sines | 235/380 |

\* cited by examiner

FINANCIAL TRANSACTION CARD WITH SOUND RECORDING

BACKGROUND OF THE INVENTION

1. Related Application

This is a continuation-in-part of application Ser. No. 10/213,475 filed Aug. 6, 2002 now abandoned.

2. Field of the Invention

This invention relates generally to the field of financial transaction cards, such as credit cards. More particularly, the invention relates to a financial transaction card and/or card reader that plays a sound recording when the card is swiped through the reader.

3. Background

Financial transaction cards are widely used. Such cards include credit cards, debit cards, and the like. Financial transaction cards also include assigned value cards, such as gift cards.

The wide range of choices available to consumers requires card issuers to differentiate their cards from those of other issuers so as to maintain or improve their market share. Transaction cards with new features and functions are being introduced to attract new customers and to establish brand identity. For example, this inventor has developed a credit card with a magnifying lens that has been successful in attracting and maintaining cardholder accounts.

Card issuers also have an interest in combating fraud, including the use of counterfeit cards. Thus, features that are difficult to counterfeit, such as holographic designs, have become popular with card issuers.

SUMMARY OF THE INVENTION

The present invention provides a system for generating a distinctive recorded sound when a credit card or other financial transaction card is used at a point of sale (POS) terminal. As is common, the POS terminal includes a card reader through which the card is swiped to read data that is encoded on a magnetic stripe affixed to the card. In one embodiment of the invention, a recorded sound is stored in the card and played back within the card when the card is swiped. In another embodiment, a recorded sound is stored in the card and is played back through the card reader when the card is swiped. In yet another embodiment, a recorded sound is stored in the card reader and is played back through the card reader when the card is swiped.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
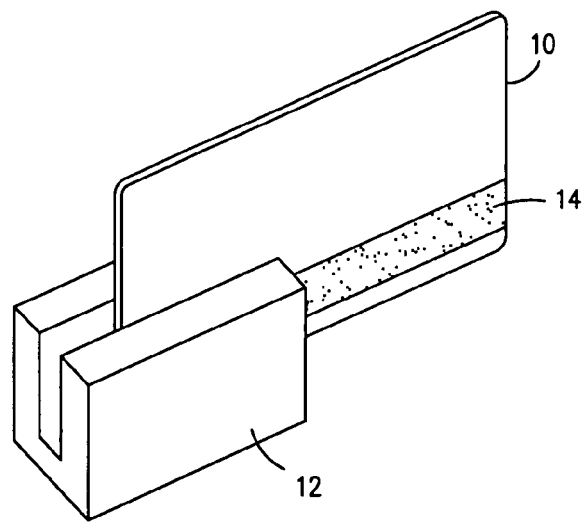
FIG. 1 illustrates a financial transaction card and card reader in which the present invention may be embodied.

FIG. 1 illustrates a financial transaction card 10 and a card reader 12 in which the present invention may be embodied. Card 10 and reader 12 are substantially similar to conventional cards and card readers that conform to standards 7810-7813 of the International Organization for Standardization (ISO). In accordance with ISO 7811, card 10 includes a magnetic stripe 14. In other embodiments, the invention may also be employed with cards that have other forms of machine readable information, such as smart cards, bar-coded cards, etc.

As used herein, the term "financial transaction card" includes not only a conventional credit card, but also any other type of card carried by a consumer that includes a magnetic strip and is physically and/or functionally similar to a conventional credit card. Such cards include, for example, debit cards, electronic cash cards, gift cards and similar assigned value cards, pre-paid calling cards, internet access cards, health insurance cards, association membership cards, identification cards, etc.

Figure 2:
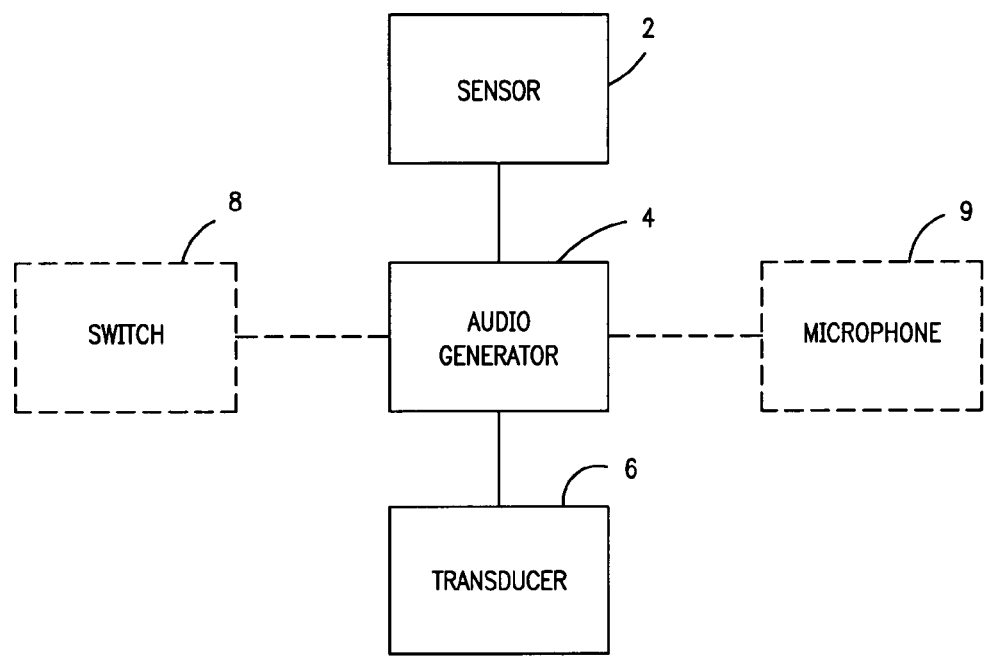
FIG. 2 is a functional block diagram of a financial transaction card in accordance with one embodiment of the present invention.

FIG. 2 is a functional block diagram of a financial transaction card 10 according to one embodiment of the invention wherein a sound is stored within the card and is played back through the card itself. A sensor 2 detects when card 10 is used to initiate a financial transaction. Typically, this occurs when the data stored on magnetic stripe 14 is read by card reader 12. Such an action is often referred to as "swiping" the card. Various types of sensors may be used. For example, sensor 2 may comprise a contact switch located on an edge of card 10 proximate to magnetic stripe 14 to detect when the card is passed through the slot of the card reader. Alternatively, sensor 2 may comprise an optical sensor to detect the decrease in light level as card 10 is passed through the card reader. In another alternative, sensor 2 may comprise a proximity sensor to detect when card 10 is placed in the slot of the card reader. In yet another alternative, sensor 2 may comprise a magnetic sensor to detect when magnetic stripe 14 is passed across the magnetic reading head of the card reader. In this regard, the magnetic stripe may be specially encoded so that the sensor 2 is triggered when the specially encoded portion passes the reading head.

Whatever type of sensor is employed, sensor 2 is connected to audio generator 4. When the reading operation is sensed, audio generator 4 is triggered to produce an audio output signal. The signal may comprise a sequence of musical notes, a pre-recorded spoken message or any other distinctive audible sound. The output of audio generator 4 is coupled to transducer 6 to convert the signal into a human perceptible sound. Optionally, card 10 may include a manually operated switch 8 connected to audio generator 4. Switch 8 may be used by the card holder to produce a stored audio signal whenever desired. This signal may be the same as that triggered by sensor 2 or may be different.

As another option, card 10 may include a microphone 9 with which the card holder may record a spoken message or other sound into audio generator 4. This is particularly useful for a gift card in which the giver may record a personalized greeting to the recipient.

It is intended that card 10 conform to all applicable ISO standards. These standards require card 10 to have a thickness of about 0.027 to 0.033 inch, which presents a challenge to incorporate the necessary electronic components in such a thin substrate. This challenge can be met using the manufacturing techniques disclosed in my co-pending application Ser. No. 10/167,259 and co-filed application entitled "Method for Making a Financial Transaction Card with Embedded Electronic Circuitry", the disclosures of which are incorporated herein by reference.

Figure 3:
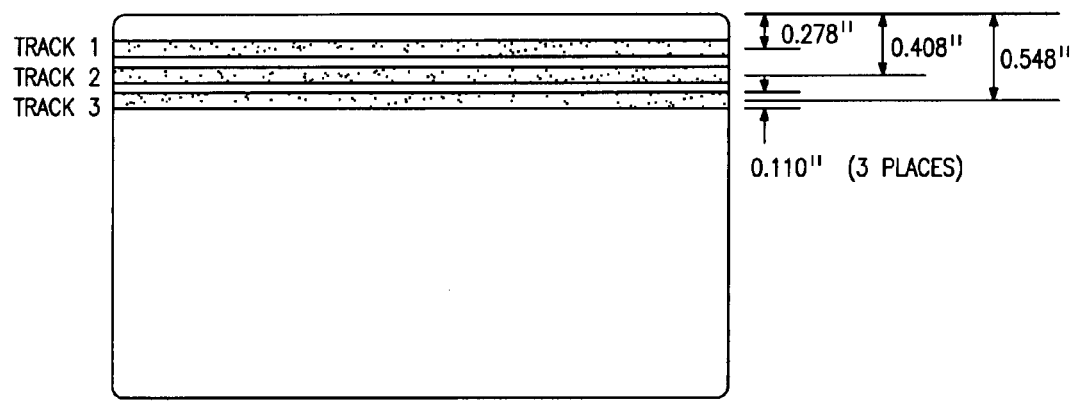
FIG. 3 illustrates the layout of tracks on the magnetic stripe of a financial transaction card in accordance with industry standards.

FIG. 3 illustrates the layout of magnetic stripe 14 for a financial transaction card as prescribed by ISO 7811. The magnetic stripe comprises three tracks referred to as track 1, track 2, and track 3. Each of the tracks is dedicated to a data format developed by industry associations. Track 1 contains alphanumeric information in a format developed by the International Air Transportation Association (IATA). Track 2 contains numeric information in a format developed by the American Bankers Association (ABA). Track 3 contains numeric information in a format developed by the thrift industry. Depending upon the intended function of card 10, data may be encoded in only one of the tracks. For example, a conventional credit card will have data encoded only in track 2. Track 2 accommodates a maximum of forty numeric characters, which include the primary account number, start and end sentinels, field separators and optional data, such as expiration date.

In one embodiment of the present invention, a sound, such as a spoken message, sequence of musical notes or other sound effect is recorded on magnetic stripe 14. The recording may be in digital or analog format and may utilize one or more of the unused tracks. In the case of an otherwise conventional credit card with data encoded on track 2, track 1 and/or track 3 may be utilized for the recorded sound. In a somewhat different embodiment, magnetic stripe 14 may be physically wider to include an additional track above track 1 or below track 3 for the recorded sound. Also, a high density magnetic medium may be used to increase the storage capacity of the magnetic stripe.

Figure 4:
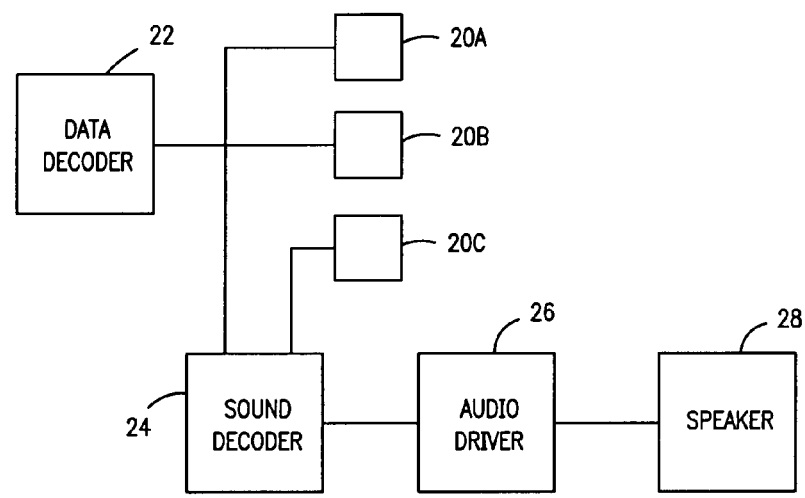
FIG. 4 is a functional block diagram of a card reader in accordance with one embodiment of the present invention.

FIG. 4 is a functional block diagram of a card reader 12 adapted to implement the present invention. Reader 12 includes heads 20A, 20B and 20C for reading track 1, track 2, and track 3, respectively. For use with conventional credit cards, head 20B is coupled to data decoder 22. Heads 20A and/or 20B are coupled to sound decoder 24. As mentioned above, the input signal(s) to sound decoder 24 may be in analog or digital format. In either case, sound decoder 24 provides an audio signal to audio driver 26, which then drives a speaker 28. Thus, as card 10 is swiped through reader 12, the sound recorded on magnetic stripe 14 is played through speaker 28.

Figure 5:
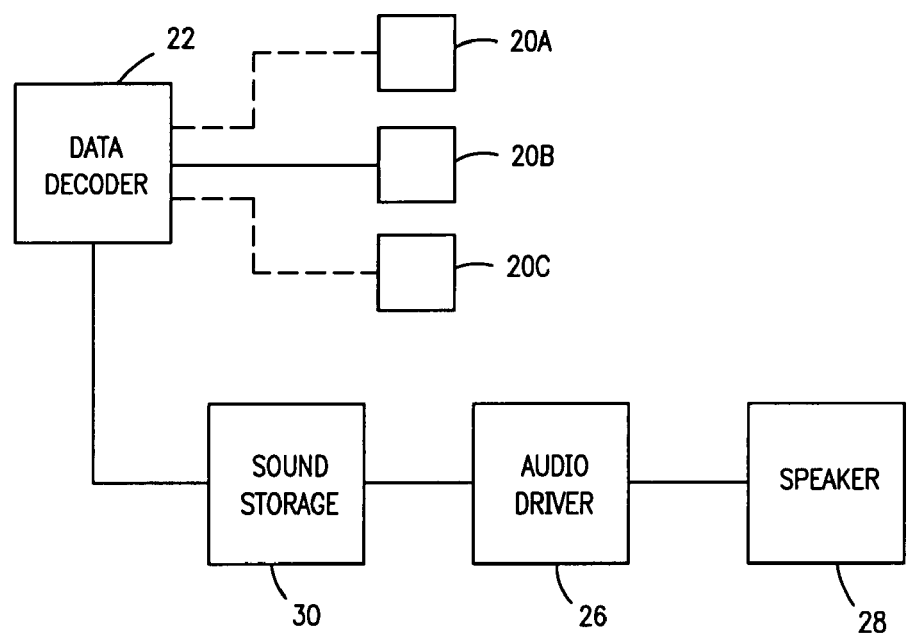
FIG. 5 is a functional block diagram of a card reader in accordance with another embodiment of the present invention.

In an alternative embodiment of the present invention, magnetic stripe 14 may be simply encoded with a "sound trigger" utilizing an otherwise unused character location within the active data track. The recorded sound is stored within the card reader. FIG. 5 is a functional block diagram of a card reader 12' for use with this alternative embodiment of the invention. Data decoder 22 receives the output of head 20B as in the previously described embodiment and, optionally, also the outputs of heads 20A and 20C. If present on magnetic stripe 14, the sound trigger is delivered to a sound storage device 30. An audio signal is then delivered to audio driver 26, which then drives speaker 28 as in the previously described embodiment. Sound storage device 30 may have a plurality of stored sounds, with the particular sound selection determined by the value of the sound trigger encoded on magnetic stripe 14. In this fashion, reader 12' may be configured to play a variety of sounds corresponding to various card issuers. Sounds may be downloaded to card reader 12' via the data connection that is ordinarily provided for communication with the card issuer(s) or third-party card authorization center.

Since card issuers are generally identified by particular digits (usually the leading group) of the primary account number, the account number itself may serve as the sound trigger. Thus, for example, if the card swiped through reader 12' is recognized as a Visa® card, a sound associated with Visa® cards would be played through speaker 28.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of emitting a sound at a card reader terminal comprising:

providing a card with a magnetic stripe encoded with transaction data and audio data separate from the transaction data;

providing a card reader with means for reading the transaction data, means for reading the audio data, an audio driver and a sound transducer;

swiping the card through the card reader;

reading the audio data encoded on the magnetic stripe;

generating a first signal in accordance with the audio data;

asserting the first signal as an input to the audio driver;

generating a second signal in the audio driver in accordance with the first signal;

asserting the second signal as an input to the sound transducer, whereby the sound transducer emits a sound in accordance with the audio data.

2. The method of claim 1 wherein the audio data is encoded on the magnetic stripe as an analog signal.

3. The method of claim 1 wherein the audio data is encoded on the magnetic stripe as a digital signal.

4. The method of claim 3 wherein the card reader further includes a sound storage device coupled to the audio driver and further including storing at least one sound in the sound storage device.

5. The method of claim 4 wherein the audio data causes the sound storage device to generate the first signal.

6. The method of claim 5 wherein a plurality of sounds are stored in the sound storage device and wherein the audio data causes the sound storage device to generate the first signal in accordance with a value of the audio data.

* * * * *